Oct. 16, 1951     J. O. BLACK     2,571,662
VERTICAL SCREW AIRCRAFT
Filed Feb. 3, 1948     3 Sheets-Sheet 1

INVENTOR.
JOHN OLIVER BLACK
BY
ATTORNEY

Oct. 16, 1951   J. O. BLACK   2,571,662
VERTICAL SCREW AIRCRAFT

Filed Feb. 3, 1948   3 Sheets-Sheet 2

INVENTOR.
JOHN OLIVER BLACK
BY
ATTORNEY.

Oct. 16, 1951    J. O. BLACK    2,571,662
VERTICAL SCREW AIRCRAFT

Filed Feb. 3, 1948    3 Sheets-Sheet 3

INVENTOR.
JOHN OLIVER BLACK
BY
Raymond H. Ternes
ATTORNEY.

Patented Oct. 16, 1951

2,571,662

UNITED STATES PATENT OFFICE 2,571,662

VERTICAL SCREW AIRCRAFT

John Oliver Black, Detroit, Mich.

Application February 3, 1948, Serial No. 5,939

10 Claims. (Cl. 244—6)

This invention relates to aircraft and, in particular, it relates to vertical screw propelled aircraft. More particularly, the invention relates to an aircraft of the helicopter type having dual spaced rotors in combination with adjustable wings.

One objectionable feature of the conventional single rotor helicopter is the necessity for torque compensation. In the present invention, I provide dual vertical air screws axially positioned at approximately the mid-wing section of the aircraft and adapted for rotation in opposite directions. By such an arrangement, the necessity for torque compensation is eliminated and greater stability and maneuverability of the aircraft is attained. I have also found that for structural purposes and for purposes of reducing vibration, it is highly desirable to provide a direct coupling of the vertical screw shaft with the engine. Accordingly, I have suspended a pair of engines from the fuselage and at a point substantially at the mid-wing section of the aircraft. Thus, it is possible, by means within the fuselage, to tilt each engine separately or simultaneously so as to present the axis of the blades of the vertical screw in a tilting position for accommodating directional flight.

I have found that it is not essential to change the angle of incidence of the blades, nor to effect a cyclic pitch control. In forward flight the advancing blade has a lower angle of incidence than the retreating blade. Since the advancing blade is directionally traveling faster than the retreating blade, the lower angle of incidence substantially balances the higher angle of incidence of the retreating blade. Consequently, the cyclic pitch control is not essential for directional movement of the vehicle. Furthermore, any variation of the vertical airscrew to induce a tipping motion is overcome, due to the opposing action of the dual vertical screw.

For direct vertical ascent I find that variable pitch control is not essential to the operation of the vehicle. While it is possible to incorporate pitch control, I prefer the greater effectiveness that can be obtained by simplicity in the rotor structure, which in itself is conducive to reliability.

In order to utilize dual spaced rotors in overlapping relation, it is essential that the rotors intermesh. This is accomplished by a direct gearing of the rotors together and employing an overriding clutch interposed between the engine shaft and the vertical screw rotor. By such an arrangement, one engine alone is capable of driving both air screws. When both engines are operating at the same speed, they each will assume proper load distribution. The overriding clutch has the additional advantage in that in the event of engine failure or stoppage the rotors continue to operate freely as an autogyro.

Another object of my invention is to provide, in combination with the vertical air screws, a pair of wings projecting from the fuselage and functioning independently of the vertical air screws. Due to the relatively slow forward speed of the aircraft, I provide the wings with an adjustable angle of incidence. This permits flight at a higher angle of attack and allows a greater degree of coordination between the functioning of the aircraft as a helicopter, an autogyro, and a conventional airplane. A still further advantage of my invention is that I provide, in combination with the foregoing, an empennage including rudder, elevators, and stabilizers.

These and other objects and advantages will appear more fully in the following detailed description when considered in connection with the accompanying drawings, in which.

Figure 1:
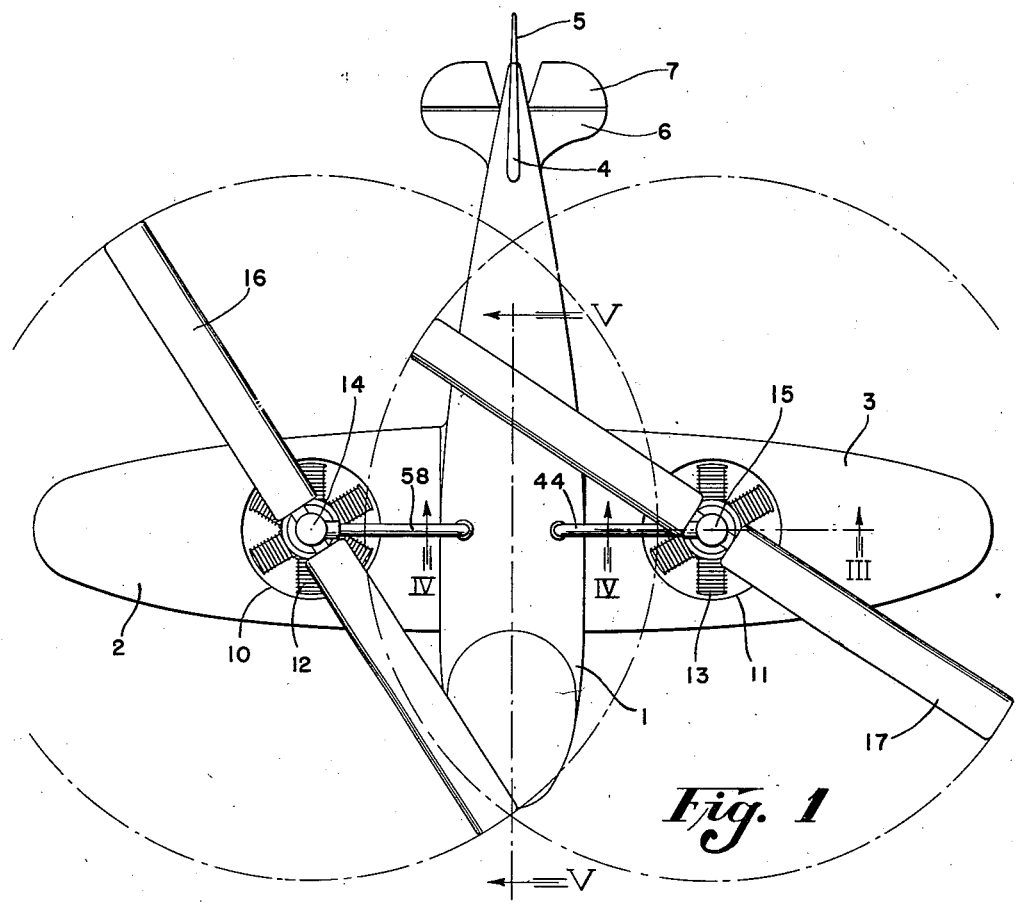
Figure 1 is a plan view of an aircraft embodying the features of my invention.
Figure 2:
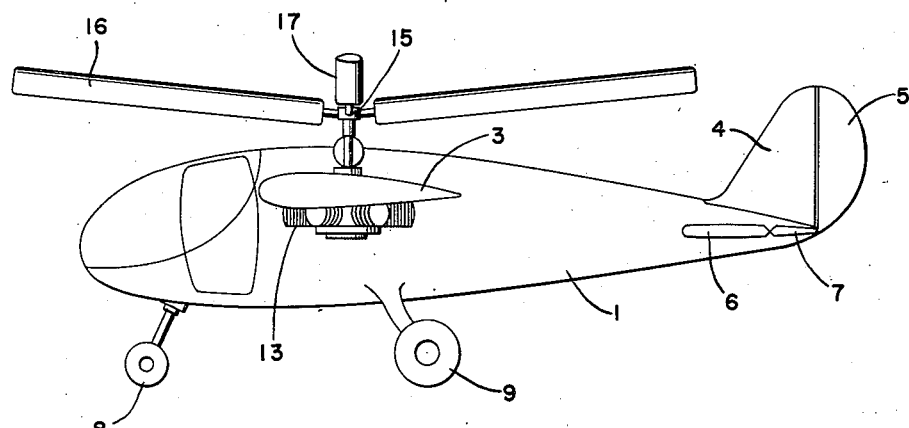
Figure 2 is a side elevational view thereof.

With reference to the drawing and, in particular, to Figures 1 and 2, I show an embodiment of my invention in the form of an aircraft consisting essentially of a fuselage 1 having attached thereto wings 2 and 3; and an empennage including a vertical stabilizer 4, a rudder 5, horizontal stabilizers 6, and elevators 7. The empennage is conventional and is operated by controls (not shown) in accordance with conventional means for operating the rudder and elevators. Landing wheels 8 and 9 complete the main structure of the aircraft.

Large apertures 10 and 11 extend through the wings 2 and 3, respectively. Within the apertures, engines 12 and 13 are independently suspended for driving the rotors 14 and 15, respectively. Vertical screw blades 16 extend from the rotor 14, and, similarly, vertical screw blades 17 extend from the rotor 15.

Figure 4:
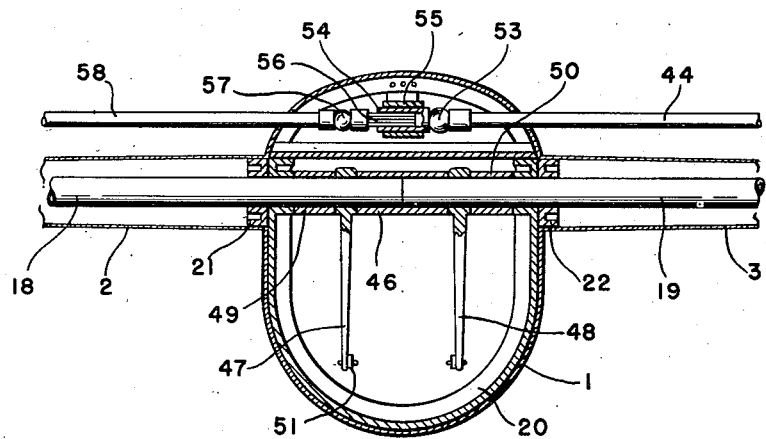
Figure 4 is a view, in section, of a portion of the aircraft taken on line IV—IV of Fig. 1.
Figure 5:
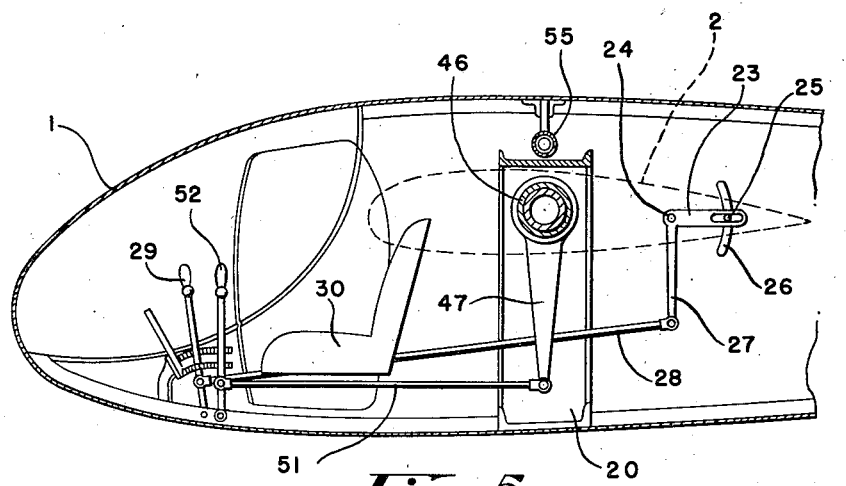
Figure 5 is a longitudinal view, in section, of a portion of the aircraft taken along lines V—V of Figure 1.

As shown, in particular, in Figure 4, a pair of tubular members 18 and 19 in axial alignment are pivotally supported by the main framework 20 of the fuselage 1. The wing 2 includes a plurality of wing section members 21 pivotally supported on the tubular member 18. Similarly, wing section members 22 of the wing 3 are pivotally supported on the tubular member 19. By this arrangement, the wings 2 and 3 may be pivotally adjusted for varying the angle of incidence of the wings. One method of operating the wings to vary the angle of incidence is shown in Figure 5. An arm 23 pivotally mounted to the fuselage at 24 engages a projecting lug 25 extending from the wing 2 and through a slot 26 through the fuselage 1. A second arm 27 extending at right angles from the arm 23 is pivotally connected to a link 28 which, in turn, joins with a lever 29 conveniently positioned in the cockpit of the aircraft, and in front of a pilot's seat 30. In this manner, it is possible for the pilot, by operation of the lever 29, to vary the angle of incidence of the wing 2 independently of the position of the vertical screw rotor 14. A similar and separate set of operating mechanism is used to control variability of the angle of incidence of the wing 3.

Figure 3:
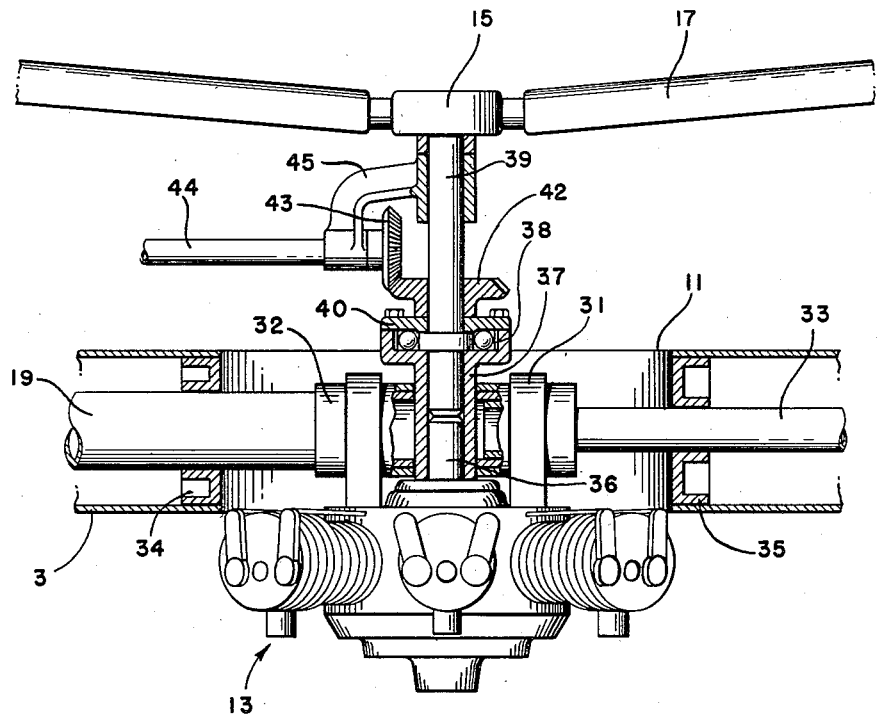
Figure 3 is an enlarged front elevational view, partly in section, of the engine and rotor taken along lines III—III of Figure 1.

The engines 12 and 13 are supported from the tubular members 18 and 19, respectively, and are independent relative to movement of the wings 2 and 3. Figure 3 illustrates the relationship of the engine 13 with the wing 2. In this case, the engine 12 is attached to the tubular member 19 by means of bands 31 passing around and attached to a sleeve 32. The sleeve 32 is fastened to the tubular member 19 and serves as a reinforcement at the region of the engine support. A continuation tubular member 33 extends from the tubular member 19 and serves as a supporting member for the tip end of the wing 2. The wing frame sections 34 and 35 are attached to the wing and are pivotally mounted on the tubular member 19 and the tubular member extension 33, respectively. The wing, therefore, is free to move pivotally on the tubular member 19 or its continuation member 33 without interferring with the movement or operation of the engine 13.

Connected to the main engine shaft 36 is a hub 37 which, in part, constitutes an overriding clutch 38. This clutch is of conventional design and constitutes, essentially, a plurality of balls adapted to engage with tapered surfaces forming walls of the clutch. The object of this overriding clutch is to permit the engine 13 to drive the rotor 15 while, at the same time, allowing the rotor 15 to rotate faster than the engine 13, or to rotate in the event the engine 13 is not operating. The effect is to produce a driven rotor as in a helicopter and a self-rotating rotor as in an autogyro. A shaft 39 extends from the rotor 15, forms a portion of the clutch mechanism 38, and extends part way into the hub 37. The rotor 15 is, therefore, axially in fixed relationship with the engine 13, for purposes of retaining the rotor and for permitting inclination of the rotor with the engine 13. A cap 40 forms a cover for the clutch 38 and acts as a retaining member for maintaining the shaft 39 in association with the engine 13.

Because the blades 16 and 17 of the rotors 14 and 15 cross over a portion of the same path during their rotation, it is necessary that the rotors be intermeshed. This is effected by means of a bevel gear 42 keyed to the shaft 39 and meshing with a gear 43 attached to a shaft 44, supported from the rotor shaft 39 by means of a bracket 45. A similar set of gears and bracket are associated with the opposite rotor 14. By this arrangement, both rotors are geared together and both rotors may be driven from one engine. Still further, the speed of the rotors will operate in accordance with the speed of the fastest rotating engine. It is understood, however, that both engines are intended to be synchronized so that the load will be properly apportioned between the engines. It still remains, however, that either engine alone may serve to propel the aircraft, and that in the absence of any power means the rotors will operate freely as an autogyro. This is a safety factor and allows a complete independence of operation of the separate engines.

In order to vary the angle of incidence of the vertical screw blades it is merely necessary for the operator to rotate either of the tubular members 18 or 19; this tilts the entire engine and the rotors associated therewith. As shown in Figure 4, the tubular members 18 and 19 pass through the fuselage where they are pivotally supported by the framework 20. A sleeve 46 is rotatably associated with the ends of the tubular members 18 and 19. The purpose of the sleeve is to maintain rigidity to the structure. An arm 47 is keyed to the tubular member 18, and, similarly, an arm 48 is keyed to the tubular member 19. A spacer sleeve 49 positions the arm 47 from the framework 20. In like manner, a sleeve 50 positions the arm 48 from the framework 20.

Figure 5 illustrates a manner in which the tubular members 18 and 19 are pivotally moved about their axis. Attached to the arm 47 is a link 51 pivotally connected to a lever 52. Movement of the lever 52 by an operator causes an axial rotation of the tubular member 18 and, consequently, a tilting of the engine 12 and the rotor 14. A similar lever and link operating mechanism (not shown) is positioned in the fuselage for operation and tilting of the engine 13 and rotor 15.

Since both engines may be tilted in different directions, it is essential that the gearing which connects the rotors together be adjustable for the different relative positions. Accordingly, the shaft 44 (Figure 4) extends into the fuselage 1 and has attached thereto a universal joint 53. A portion of this universal joint is in the form of a sleeve 54 which is freely slidable within a bracket 55 attached to the framework 20. A splined shaft 56 attached to a universal joint 57 extends into the sleeve 54 and is axially slidable therewith while maintaining a fixed relationship insofar as rotation is concerned. A shaft 58 attached to the universal joint 57 is similar to the shaft 44 and connects with the gearing associated with the rotor 14.

In the operation of the vehicle of my invention, one of the engines may be started which, due to the overriding clutch, will operate both of the vertical screw rotors. When the second engine is started it will function to supplement the power of the oppositely disposed engine. Upon attaining the proper operating speed the vehicle will lift vertically. In accordance with the present invention, it is intended that the angles of attack of the separate blades are not separably controlled and, also, that no cyclic pitch control is required. It is to be understood, however, that such features may be included, if desired.

Upon reaching the desired elevation the operator moves the lever controls, such as 52, for operating the arms 47 and 48. For direct forward motion the arms 47 and 48 are moved backward so as to tilt the rotors 14 and 15 ahead, Accordingly, the vehicle will advance in a forward direction, due to the greater pitch of the retreating blades. The rotors 14 and 15 may be tipped rearwardly to effect a rearward motion of the vehicle. Also, one of the rotors may be tipped in a forward direction and the opposite rotor in a rearward direction so as to constitute a turning movement of the vehicle. Due to the synchronized spaced rotors, it is not necessary to provide torque compensating means.

Because of the relatively low forward speed of the vehicle I provide, in combination with the vertical screws, a pivotal set of wings in which the angle of incidence is variable. This is desirable because a greater wing angle produces a higher lift at slower speeds and supplements the versatility of operation of the vehicle. While both the wings and the empennage are not essential for the operation of the helicopter, they serve as a safety factor which not only supplement the operation of the vehicle but serve as a combination in which a higher degree of performance can be obtained by the helicopter through the additive functional combination of the simultaneously operable controls.

While the engines as described herein are disclosed as the reciprocating type, it is to be understood that they may be of the jet type and that the air screws may be propelled from the jet engines.

As thus shown and described, it is believed that I have provided a helicopter which provides a new combination while maintaining desirable safety factors. While I have shown a preferred embodiment of my invention it is to be understood that it is intended to include those modifications which obviously appear within the spirit of my invention and as appearing in the scope of the appended claims.

Having thus described my invention, what I claim and desire to protect by Letters Patent is:

1. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, and means mounting said wings on said supports independently of said engines.

2. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means interconnecting the air screws for maintaining said propellers in synchronization, and means mounting said wings on said supports independently of said engines.

3. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, an over riding clutch interposed between said engines and said air screws, means interconnecting the air screws for maintaining said propellers in synchronization, and means mounting said wings on said supports independently of said engines.

4. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means mounting said wings on said supports independently of said engines, and means for pivotally moving the wings about said supports for varying the angle of incidence.

5. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means mounting said wings on said supports independently of said engines, and means for pivotally moving each wing independently of the other about said support for varying the angle of incidence.

6. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means mounting said wings on said supports independently of said engines, and means for pivotally moving the supports for tilting the engines and the air screws.

7. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means mounting said wings on said supports independently of said engines, and means for pivotally moving each support independently of the other for tilting the engines and the air screws.

8. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means mounting said wings on said supports independently of said engines, means for pivotally moving the wings about said supports for varying the angle of incidence, and means for pivotally moving the supports for tilting the engines and the air screws.

9. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means mounting said wings on said supports independently of said engines, means for pivotally moving each wing independently of the other about said support for varying the angle of incidence, and means for pivotally moving each support independently of the other for tilting the engines and the air screws.

10. An aircraft comprising a fuselage and a pair of wings extending from the fuselage, each of said wings having a well extending therethrough, an engine positioned at least in part in each of said wells, a support extending from each side of the fuselage on which each engine is mounted, a vertically lifting air screw rotatable in a horizontal plane connected to each engine and positioned above both said engine and the adjacent wing, means mounting said wings on said supports independently of said engines, an over riding clutch interposed between said engines and said air screws, means interconnecting the air screws for maintaining said propellers in synchronization, means for pivotally moving each wing independently of the other about said support for varying the angle of incidence, and means for pivotally moving each support independently of the other for tilting the engines and the air screws.

JOHN OLIVER BLACK.

REFERENCES CITED

The following references are of record in the file of this patent:

UNITED STATES PATENTS

| Number | Name | Date |
|---|---|---|
| Re. 15,550 | Zimmermann | Feb. 27, 1923 |
| 1,851,764 | Hahn | Mar. 29, 1932 |
| 1,923,973 | Gudorf et al. | Aug. 22, 1933 |